(12) United States Patent
Jiménez et al.

(10) Patent No.: US 11,373,148 B2
(45) Date of Patent: Jun. 28, 2022

(54) TRASH COLLECTION SYSTEMS AND METHODS

(71) Applicant: Telefonaktiebolaget L M Ericsson (publ), Stockholm (SE)

(72) Inventors: Jaime Jiménez, Helsinki (FI); Jari Arkko, Kauniainen (FI); Heidi-Maria Back, Helsinki (FI); Ari Keränen, Helsinki (FI); Mohit Sethi, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1188 days.

(21) Appl. No.: 14/973,910

(22) Filed: Dec. 18, 2015

(65) Prior Publication Data

US 2017/0178125 A1 Jun. 22, 2017

(51) Int. Cl.
*G06Q 10/00* (2012.01)
*G07F 7/06* (2006.01)

(52) U.S. Cl.
CPC .............. *G06Q 10/30* (2013.01); *G07F 7/06* (2013.01); *Y02W 90/00* (2015.05)

(58) Field of Classification Search
CPC ........... G06Q 10/30; G07F 7/06; Y02W 90/20
See application file for complete search history.

(56) References Cited

U.S. PATENT DOCUMENTS

| | | | | |
|---|---|---|---|---|
| 6,371,375 B1 * | 4/2002 | Ackley | ................ | G06K 7/0004 235/462.45 |
| 6,446,206 B1 * | 9/2002 | Feldbaum | ........... | H04L 63/0823 713/170 |
| 2002/0152106 A1 * | 10/2002 | Stoxen | ................... | G06Q 10/10 705/7.13 |
| 2007/0001809 A1 * | 1/2007 | Kodukula | ............ | G06K 7/0008 340/10.1 |
| 2007/0080804 A1 * | 4/2007 | Hirahara | ............ | G06K 7/10178 340/572.1 |
| 2007/0090197 A1 * | 4/2007 | Senda | .............. | G06K 19/06037 235/494 |
| 2007/0146141 A1 * | 6/2007 | Popplewell | ...... | G06K 19/07749 340/572.8 |
| 2014/0181504 A1 * | 6/2014 | Almahallawy | ..... | H04L 63/0823 713/156 |

(Continued)

OTHER PUBLICATIONS

"Great Pacific Garbage Patch," Wikipedia, Wikimedia Foundation, Dec. 11, 2015, https://web.archive.org/web/20151211061812/https://en.wikipedia.org/wiki/Great_Pacific_garbage_patch.

(Continued)

*Primary Examiner* — John W Hayes
*Assistant Examiner* — Ari Shahabi
(74) *Attorney, Agent, or Firm* — Rothwell, Figg, Ernst & Manbeck, P.C.

(57) ABSTRACT

Systems and methods for increasing the value of trash. By increasing the value of trash, persons have an incentive to collect litter and deposit the collected litter at an appropriate trash collection site (e.g., garbage can, reverse vending machine, recycling center, etc.). In one aspect, a financial instrument (e.g., a Bitcoin, Bitcoin-like value, account identifier, or any other financial instrument) or a pointer to a financial instrument is attached to the object itself or placed inside of the object in a way that is not easily extracted before appropriate time.

17 Claims, 5 Drawing Sheets

(56) References Cited

U.S. PATENT DOCUMENTS

2015/0227910 A1* 8/2015 Maxwell .............. G06Q 20/385
　　　　　　　　　　　　　　　　　　　　　　　　705/44
2016/0098723 A1* 4/2016 Feeney ................ G06Q 20/065
　　　　　　　　　　　　　　　　　　　　　　　　705/75

OTHER PUBLICATIONS

"Bitcoin" Wikipedia, Wikimedia Foundation, Dec. 14, 2015, https://web.archive.org/web/20151214063011/https://en.wikipedia.org/wiki/Bitcoin.

"Secure Digital," Wikipedia, Wikimedia Foundation, Dec. 17, 2015, https://web.archive.org/web/20151217054015/https://en.wikipedia.org/wiki/Secure_Digital.

DRAMeeXchange, TrendForce Corp, Nov. 28, 2015, http://web.archive.org/web/20151128151210/http://www.dramexchange.com/.

Rapid Electronics, "Electronic Components," Nov. 10, 2015, https://web.archive.org/web/20151110110114/http://www.rapidonline.com/Electronic-Components.

Rapid Electronics, "BR24T01FJ-WE2 Rohm 1K EEPROM I2C," May 30, 2014, http://www.rapidonline.com/Electronic-Components/BR24T01FJ-WE2-Rohm-1K-EEPROM-I2C-51-6368.

* cited by examiner

TRASH COLLECTION SYSTEMS AND METHODS

TECHNICAL FIELD

Aspects of this disclosure relate to the collection of trash.

BACKGROUND

Today's trash-collection schemes work through physical identification of specific types of trash. For instance, regulations may exist that require a new car to have a deposit of a few hundred Euros that will be paid back to the owner of the car when the car is returned to a wrecking company at the end of the car's usable life. As an another example, a customer who deposits a used bottle in a recycling machine (a.k.a., "reverse vending machine") is credited with a small amount of money provided that the machine is able to recognize the bottle (e.g., read a bar code printed on the bottle).

Only a small fraction of all consumer goods belong to the special categories of things for which deposit-based systems work. For all other trash the unfortunate reality is that, while there is inherent value in the materials themselves (e.g., for fuel or re-use), that value usually does not exceed the cost to collect the trash and deliver it to an appropriate trash collection point. As a result, a large amount of trash remains in the environment or is dumped onto landfill in an uncoordinated fashion with no sorting.

SUMMARY

A fundamental problem with conventional deposit systems is that the value of the trash object has to be increased through some artificial means—such as a government mandate—to make collection profitable. Ideally, these artificial means should work on far more diverse types of goods and situations than the current deposit system, but scaling the current deposit systems to other goods would face at least the following obstacles: 1) trash collection systems are local, based on country regulations rather than global, yet trash travels globally; 2) it is difficult to scale conventional trash collection systems to objects smaller than bottles; and 3) conventional systems are prone to fraud (e.g., the bar codes and object form recognition in bottles is easy to forge, merely with a printer, as long as manufacturing a copy of the object is cheaper than the returned deposit value, such fraud would be economically viable).

This disclosure provides systems and methods for increasing the value of trash that are not based on government regulation or industry self-regulation. By increasing the value of trash, persons have an incentive to collect litter and deposit the collected litter at an appropriate trash collection site (e.g., garbage can, reverse vending machine, recycling center, etc.

In one aspect, a financial instrument (e.g., a Bitcoin, Bitcoin-like value, account identifier, or any other financial instrument) or a pointer to a financial instrument is attached to the object itself or placed inside of the object in a way that is not easily extracted before appropriate time. In the rest of this description we refer to the embedded financial instrument (or pointer) as a Trashcoin.

In one embodiment, when an object is being manufactured a Trashcoin is added to the object. Whoever brings the object in for recycling can obtain the Trashcoin embedded in the object and then use the Trashcoin to purchase items (or make a donation, fund an account, etc.), thereby providing an incentive for either the owner of the object or garbage collectors to recycle the object. In some embodiments, the embedded Trashcoin should not be easily extractable from the object in an inappropriate manner, as otherwise the Trashcoin could be prematurely used, perhaps even before the object is used or sold. Accordingly, in some embodiments, a ledger of all Trashcoin transactions (e.g., a global ledger) ensures that a holder of a Trashcoin cannot double spend the Trashcoin, like the Bitcoin global ledger ensures that the holder of Bitcoins cannot double spend them. In addition, in some embodiments, physical protection ensures that the Trashcoin embedded in an unused product cannot be reclaimed. As an example, a Trashcoin inside a canned product cannot be extracted without first opening the can.

Advantages

Advantages of at least some of the systems and method disclosed herein include: 1) a technical, economics-based deposit value rather than something imposed through regulation or value of the raw materials only; 2) a cryptographic method for secure assignment, storage, and retrieval of Trashcoins in objects of any significant size; 3) a method for deposit arrangements across borders and administrations; 4) a method for tracking of deposit transactions by preventing returning the same object twice; and 5) methods for physically preventing deposit values to be reclaimed before opening or using the object.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments.

DETAILED DESCRIPTION

Figure 1:
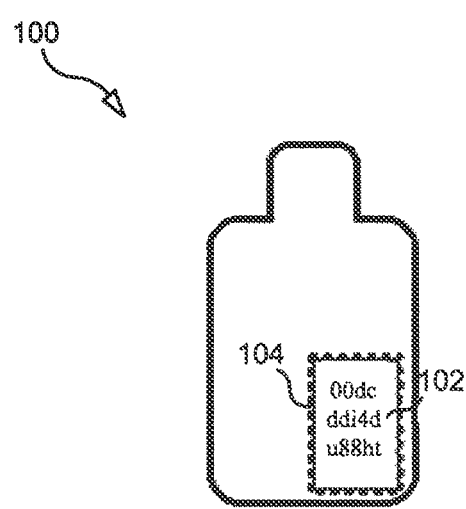
FIG. 1 illustrates an example recyclable article of manufacture (RAoM).

As discussed in the Summary, in one aspect a manufacturer creates a tangible product 100 (see FIG. 1), referred to herein as a "recyclable article of manufacture (RAoM)" 100 (see FIG. 1), such as a bottle or any other object, and embeds a Trashcoin 102 in the RAoM 100. More specifically, for example, a data storage medium 104 (e.g., label, a memory device, a radio frequency identification (RFID) tag) can be attached directly or indirectly to a surface of the RAoM (100) or placed within the RAoM and the data storage medium 104 is used to store the Trashcoin 102.

Embodiments of the Data Storage Medium 104

In one embodiment, the data storage medium is a label (e.g., a piece of paper, fabric, plastic, or similar material) affixed to the RAoM and displaying a barcode code (e.g., a QR code) encoding the Trashcoin. This is a well-understood technique, used today when making physical "novelty" coins or paper-based Bitcoin backups. The advantage of this design is that is very easy to make, and practically cost free for the manufacturer if the RAoM already includes a label onto which the Trashcoin can be printed. For instance, a bar/QR-code would be very easy to add to an existing label, and the necessary changes to support a Trashcoin based design would be in software, not hardware.

In another embodiment, the data storage medium 104 is in the form of a small memory device, such as a standard memory card with a card or USB interface or a bare memory chip. A bar memory chip might be embedded into the RAoM itself, such as embedded inside the plastic of a plastic bottle. A standard memory card, such as a micro-SD card, is quite small (e.g., 11 mm×15 mm×1 mm). A bare chip is even smaller. For example, the M25P16-VMN6P flash embedded memory by Micron Technologies is about 5 mm×4 mm×1.5 mm.

In another embodiment, the data storage medium 104 is in the form of a radio technology based device, such an RFID tag. Some RFID tags can be printed, which makes their manufacturing inexpensive and convenient. Basic, passive RFID tags are very cheap and easily usable on many different types of products. An advantage of this approach is that information can be read remotely and without destroying the RAoM. The downside is that information might be read remotely and maliciously, such as attempting to read the Trashcoin from RAoMs in a shop and then use or spend the Trashcoin. There are some defenses against this, however, as will be described below in the security section.

Trashcoin Embodiments

In some embodiments, the Trashcoin comprises a private cryptographic key, which is paired with a public cryptographic key, as is known in the art of cryptography (i.e., there is a mathematical relationship between the public and private keys such that data encrypted with the public key can be decrypted using the private key but cannot be decrypted using the public key). For instance, the Trashcoin may represent a Bitcoin.

In the embodiments where the Trashcoin comprises a private key pared with a public key, the public key represents a destination of a transfer, or a promised transfer, of an amount of currency ("value"). In some embodiments, the value is transferred to the destination (or address) represented by the public key before the RAoM is sold to a consumer. For example, the value may be transferred even before the RAoM is made or shortly after the RAoM is made. Thus, in some embodiments, the public key corresponds to an address to which the amount of currency has already been transferred. The Trashcoin may also include the public key as well as other information.

Because the public key represents the destination of the transfer of the value (or promised transfer), the private key that is paired with the public key is required in order to spend or receive the value, as is known in the art of cryptocurrency. That is, only a holder of the private cryptographic key is able to spend or receive the value. Preferably, the holder of the private cryptographic key is provided with the right to spend the amount of currency only after the RAoM is properly disposed of. For example, the RAoM may include contractual terms that specify that the value available to the holder of the Trashcoin may only be spent after the RAoM has been recycled (or brought to a recycling center). Thus, the holder of the Trashcoin may obligate himself/herself such that he/she will spend the Trashcoin only after the RAoM from which the Trashcoin was embedded has been recycled or otherwise appropriately disposed of. In this way, the holder of the Trashcoin private key is provided with the right to spend the amount of currency only after the RAoM is properly disposed of.

In some embodiments, the transfer or promise is recorded in a ledger (e.g., in a transaction record of a global ledger). For example, in the embodiments where the public key paired with the private key corresponds to an address to which the amount of currency has already been transferred, a ledger maintains a record of this transaction. This record will indicate that the amount of currency (e.g., 0.001 Bitcoins) has been transferred to the address represented by the public key. Specifically, in some embodiments, the record includes the public key and information indicating the amount of currency that was transferred.

In such embodiments, when a first person who has obtained the Trashcoin wants to spend the Trashcoin by, for example, purchasing a product or service from a merchant, donating the Trashcoin, or adding the Trashcoin to a digital wallet owned by the first person, the first person may transfer the Trashcoin to the intended address (e.g., the merchant's address or an address belonging to the first person's digital wallet). This transfer will also be recorded in the ledger.

For example, in some embodiments, the first person may pay for a product purchased from a merchant by using software (e.g., a wallet app) to generate a signature using the private key and transmit a message indicating that the value of the Trashcoin is being transferred to the merchant, wherein the message includes the merchant's address, the signature and the public key. In some embodiments, this message may also include information for identifying the first person. In this way, a record can be created each time a person spends a Trashcoin. This can be used to prevent fraud because, if the first person who spends the Trashcoin embedded in a RAoM does not in fact recycle the RAoM, then another person (a "second" person) may find the RAoM, obtain the Trashcoin embedded in the RAoM, recycle the RAoM, and then attempt to spend the obtained Trashcoin. This subsequent spending attempt, however, will fail because the ledger will indicate that the Trashcoin has already been spent by the first person. Such a situation provides an indication that the first person did not actually recycle the RAoM. In such a situation, action can be taken against the first person (e.g., he/she could be fined for redeeming a Trashcoin embedded in a RAoM without recycling the RAoM). Hence, in some embodiments, it is important to include in the message sent to the first merchant the information for identifying the first person. Such information may include a digital signature created using a private key allocated to the first person.

Figure 2:
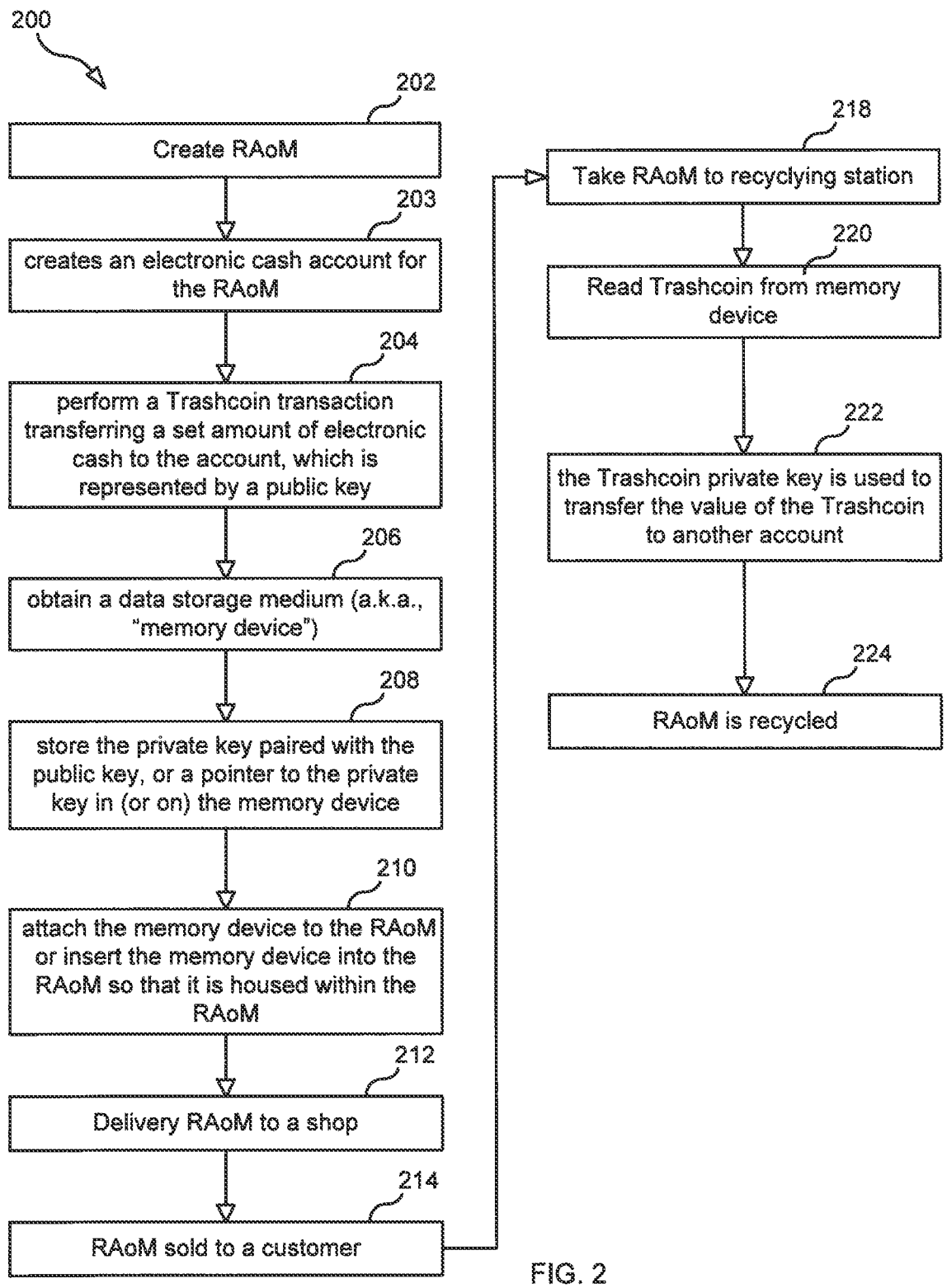
FIG. 2 is a flow chart illustrating a process according to some embodiments.

Referring now to FIG. 2, FIG. 2 illustrates a process 200, according to some embodiments, for facilitating trash collection and recycling.

The process 200 may begin with step 202, where a manufacturer creates a RAoM (e.g., a bottle).

In step 203, the manufacturer creates an electronic cash account for this particular RAoM. In one embodiment, creating the electronic cash account comprises the manufacturer obtaining a public-private key pair, where the public key is like an account number (or address) and the private key is what is needed to transfer money out of that account (e.g., the private key is used to generate digital signatures).

In step 204, the manufacturer performs a Trashcoin transaction transferring a set amount of electronic cash (e.g., 10 cents) to the account represented by the public key. For example, in some embodiments, performing a Trashcoin transaction comprises the manufacturer transmitting a message indicating that the manufacturer wishes to transfer the amount to the address defined by the public key of the public-private key pair, wherein the message includes the public key and a digital signature generated using a private key belonging to the manufacturer (this private key is different than the private key that is paired with the public key). In embodiments where the Trashcoin is a Bitcoin the message is sent to the Bitcoin miners to validate the transaction.

In step 206, the manufacturer obtains (e.g., constructs) a data storage medium (e.g., memory chip, label, RFID tag).

In step 208, the manufacturer stores the Trashcoin (i.e., the private key paired with the public key, or a pointer to the private key, and any other information that may be required to spend the Trashcoin) in (or on) the data storage medium (a.k.a., "memory device").

In step 210, the manufacturer attaches the memory device to the RAoM (e.g., it may be attached to an outer or inner surface of the RAoM) or inserts the memory device into the RAoM (possibly in parallel with making it in Step 202) so that it is housed within the RAoM.

In step 212, the RAoM is delivered to a shop.

In step 214, the RAoM is sold to a consumer.

In step 218, the consumer (or a garbage collector) takes the object to a recycle station.

In step 220, the Trashcoin is read from the memory device. For example, the consumer/collector may perform step 220 or step 220 may be performed by an employee at the recycle station.

In step 222, after the Trashcoin is read from the memory device, the Trashcoin private key (i.e., the private key read in step 220 or a private key obtained using the pointer read in step 220) is used to transfer the value of the Trashcoin to another account (e.g., the consumer's/collector's digital wallet). A ledger records this transaction so any double use of the same account/private key will be detectable.

In step 224, the object is recycled or destroyed.

In some embodiments, the RAoM (or the memory device) contains terms and conditions that specify that the holder of the Trashcoin is authorized to spend the Trashcoin only after the RAoM is properly disposed of (e.g., placed in a designated recycling bin). In such embodiments, a computer program 302 (see FIG. 3) is used by the customer/collector to read the Trashcoin from the memory device and the computer program displays the terms and conditions and, for example, an "accept" button that the customer/collector must activate in order to obtain the Trashcoin private key (or other means can be used to indicate that the customer/collector has accepted the terms and conditions). In this other way, the holder of the Trashcoin private key is provided with the right to spend the amount of currency only after the RAoM is properly disposed of. In some embodiments, the program 302 may also verify that the recycling station is on an approved list of stations and that the person is indeed returning the RAoM, and optionally, sign the transaction with the recycling station's key, as a part of the overall transaction.

In another embodiment, the Trashcoin does not include the private key, but rather includes a "pointer" to the private key. The "pointer" is an identifier for identifying the private key. In such an embodiment, the user who recycles the RAoM needs to use the pointer to obtain the private key so that the user can spend the Trashcoin. In some embodiments, the computer program 302 (a.k.a., "app 302") (see FIG. 3) is used to obtain such private keys. In some embodiments, the user needs to first install the app 302 on a computing device 304 (e.g., smartphone, computer, tablet, or any other device comprising a processor and a memory) and then create an account having an account identifier by entering into the app registration information (e.g., name, username, address, email address, phone number).

Figure 3:
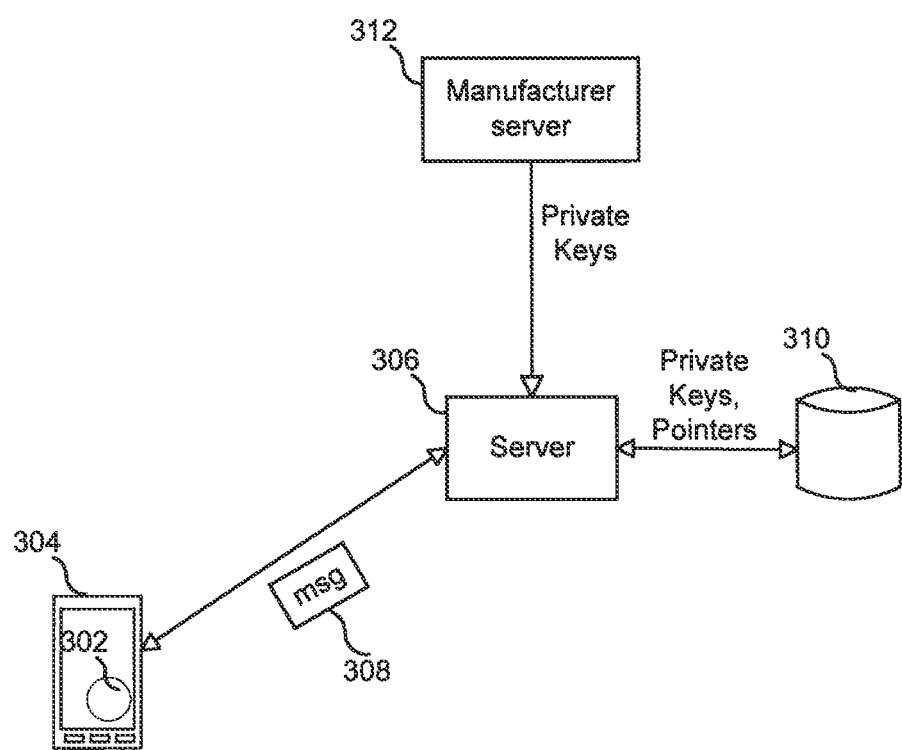
FIG. 3 illustrates a system according to some embodiments.

Once the user has done this, the user inputs the pointer into the app (e.g., where the storage media is in the form of a label containing a QR code encoding the Trashcoin, the user can input the pointer into the app by using the app to take a picture of the QR code). After the app obtains the pointer, the app transmits to a server computer 306 a message 308 requesting the private key corresponding to the pointer, the message includes the pointer and information for identifying the user (e.g., the account identifier, username, email address). As shown in FIG. 3, server 306 receives keys from manufacturer 312 and, for each received key, stores the key along with a pointer to the key in a database 310.

The server 306, in response to receiving the request, checks to see whether it has previously received a message requesting the private key corresponding to the pointer. If it has, an error message is sent back to the app, otherwise the server transmits to the app the private key (and any other information that may be needed by the user to spend the Trashcoin, such as, the public key) and records in database 310 a record indicating that the private key has been sent to the user (e.g., the database record may comprise the information for identifying the user and the pointer). In this way, the system 100, for fraud prevention purposes, can keep track of each user that has obtained one of the private keys embedded in a RAoM. For example, if the user used the app to obtain the private key but did not recycle (or otherwise appropriately dispose of) the RAoM, then another user who does recycle the RAoM may use the app to request the private key. Because of the record stored in the database, such a situation provides an indication that the first user did not actually recycle the RAoM. In such a situation, action can be taken against the first user (e.g., he/she could be fined).

Once the user obtains the private key (and other information, if any, necessary to spend the Trashcoin), the user can spend the Trashcoin as described above.

In other embodiments, the Trashcoin does not include a private key or a pointer to such a key, but rather comprises a code (e.g., an account identifier, a serial number, etc.), or a pointer to a code, where the code is associated with an amount of currency that is to be transferred to the entity that recycles the RAoM. In this embodiment, the system described above and shown in FIG. 3 is adapted to use pointers to obtain codes rather than private keys. That is, for example, the server 306 returns a code rather than a key in response to receiving a request comprising a pointer.

Figure 4:
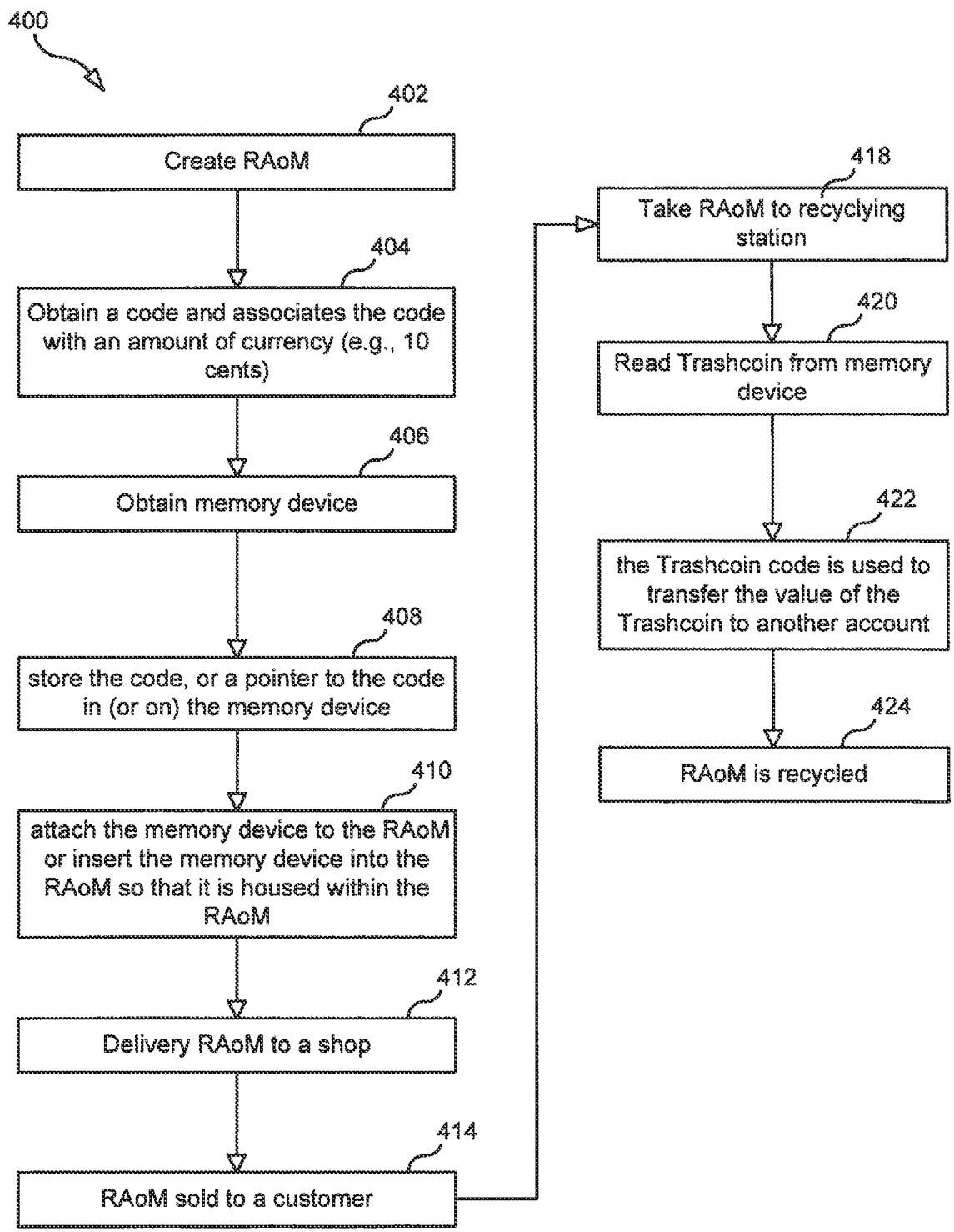
FIG. 4 is a flow chart illustrating a process according to some embodiments.

Referring to FIG. 4, FIG. 4 illustrates a process 400, according to some embodiments, for facilitating trash collection and recycling.

The process 400 may begin with step 402, where a manufacturer creates a RAoM (e.g., a bottle).

In step 404, the manufacturer obtains a code and associates the code with an amount of currency (e.g., 10 cents) (e.g., stores information in a database that links the code with information identifying the amount of currency).

In step 406, the manufacturer obtains (e.g., constructs) a data storage medium (e.g., memory chip, label, RFID tag).

In step 408, the manufacturer stores a Trashcoin (i.e., the code, or a pointer to the code, and any other information that may be required to spend the Trashcoin) in (or on) the data storage medium (a.k.a., "memory device").

In step 410, the manufacturer attaches the memory device to the RAoM or inserts the memory device into the RAoM (possibly in parallel with making it in Step 402) so that it is housed within the RAoM.

In step 412, the RAoM is delivered to a shop.

In step 414, the RAoM is sold to a consumer.

In step 418, the consumer (or a garbage collector) takes the object to a recycle station.

In step 420, the Trashcoin is read from the memory device. For example, the consumer/collector may perform step 420 or step 420 may be performed by an employee at the recycle station.

In step 422, after the Trashcoin is read from the memory device, the Trashcoin code (i.e., the code read in step 420 or a code obtained using the pointer read in step 420) is used to transfer the value of the Trashcoin to another account. In some embodiments, step 422 comprises: transmitting the code (or pointer) to a server, the server determining whether the code is a valid code, and the server transferring the value to the other account as a result of determining that the code is a valid code (in some embodiments the value is transferred to the consumer's Bitcoin wallet). In some embodiments, the server determines whether the code is a valid code by determining whether the code is associated with a flag indicating that the code has previously been redeemed. If it is not associated with such a flag, then the code is valid. After determining that the code is valid (or after transferring the value), the server may associate the code with the flag so that the code cannot be used again until the code is no longer associated with the flag.

In step 424, the object is recycled or destroyed.

Figure 5:
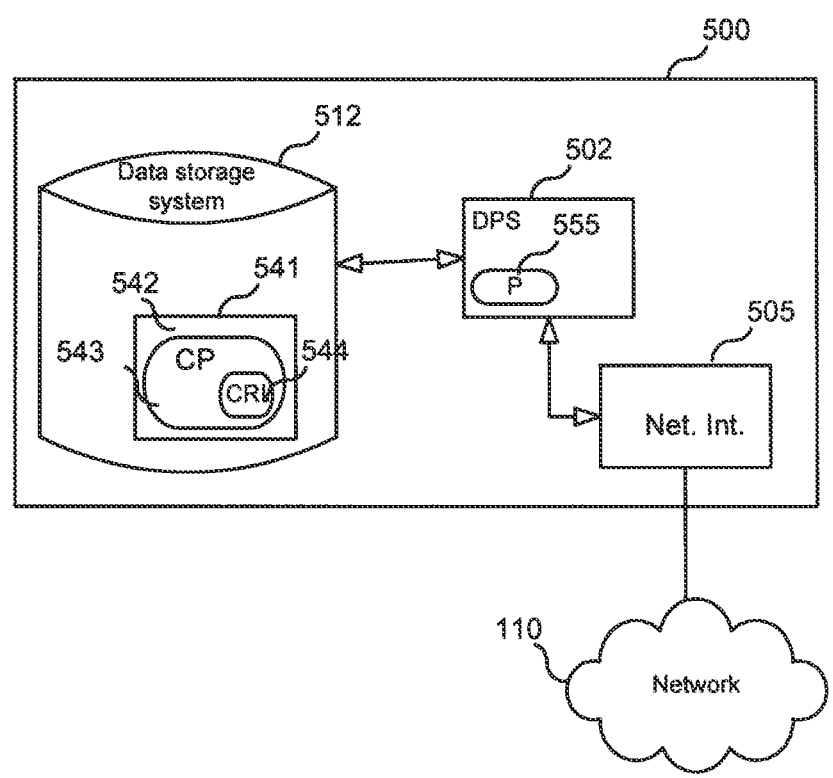
FIG. 5 is a block diagram illustrating an a computing device according to some embodiments.

FIG. 5 is a block diagram of an embodiment of a computing device 500 that can be used to implement either computing device 302 or server computer 304. As shown in FIG. 5, device 500 may include: a data processing system (DPS) 502, which may include one or more processors 555 (e.g., a general purpose microprocessor and/or one or more other data processing circuits, such as an application specific integrated circuit (ASIC), field-programmable gate arrays (FPGAs), and the like); a network interface 505 coupled to DPS 502 for use in transmitting data and receiving data; and a data storage system 512, which may include one or more non-volatile storage devices and/or one or more volatile storage devices (e.g., random access memory (RAM)). In embodiments where device 500 includes a general purpose microprocessor, a computer program product (CPP) 541 may be provided. CPP 541 includes a computer readable medium (CRM) 542 storing a computer program (CP) 543 comprising computer readable instructions (CRI) 544. CRM 542 may be a non-transitory computer readable medium, such as, but not limited to, magnetic media (e.g., a hard disk), optical media (e.g., a DVD), memory devices (e.g., random access memory), and the like. In some embodiments, the CRI 544 of computer program 543 is configured such that when executed by data processing system 502, the CRI causes the device 500 to perform steps described above (e.g., steps described above with reference to the flow charts). In other embodiments, device 500 may be configured to perform steps described herein without the need for code. That is, for example, data processing system 502 may consist merely of one or more ASICs. Hence, the features of the embodiments described herein may be implemented in hardware and/or software.

Security Features

In some embodiments, the RAoM is configured such that the private key cannot be obtained easily from the data storage medium before the RAoM is sold. For example, the data storage medium may be embedded in the RAoM such that the Trashcoin (e.g., private key) cannot be read from the data storage medium until at least a part of the RAoM is removed from the RAoM. For instance, in some embodiments, the data storage medium is a first label and the first label is disposed inside of the RAoM or underneath a second label attached to the RAoM such that the first label cannot be seen unless the RAoM is opened or the second label is removed. In other embodiments, the RAoM comprises a closed metal can, the data storage medium is an a radio frequency identification (RFID) tag, the RFID tag is located inside of the metal can, and the RFID tag cannot be read until the metal can is opened.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A recyclable article of manufacture (RAoM), the RAoM comprising:
   a closed metal can comprising at least one surface, wherein the at least one surface is located inside of the metal can; and
   a data storage medium attached to the at least one surface of the RAoM,
   wherein the data storage medium is a radio frequency identification (RFID) tag,
   wherein the RFID tag cannot be read until the metal can is opened,
   wherein the data storage medium stores a private cryptographic key or a pointer to the private cryptographic key, which is paired with a public cryptographic key,
   wherein the private cryptographic key is a financial instrument associated with an amount of currency, and
   wherein the public cryptographic key represents a destination for receiving a transfer of the amount of currency.

2. The RAoM of claim 1,
   wherein the data storage medium stores the pointer to the private cryptographic key,
   wherein a message is received from an application comprising the pointer.

3. The RAoM of claim 2,
   wherein in response to a determination that a previous message comprising the pointer has not been received, the private cryptographic key is transmitted to an application and a record comprising the pointer is recorded in a database.

4. The RAoM of claim 2,
   wherein in response to a determination that a previous message comprising the pointer has been received, an error message is transmitted to an application.

5. The RAoM of claim 1,
   wherein the private cryptographic key is a Bitcoin.

6. A method for facilitating the recycling of a recyclable article of manufacture (RAoM), the method comprising:
  obtaining the RAoM, the RAoM comprising a closed metal can comprising at least one surface, wherein the at least one surface is located inside of the metal can;
  storing a private cryptographic key or a pointer to the private cryptographic key on a data storage medium, wherein the data storage medium is a radio frequency identification (RFID) tag, wherein the private cryptographic key is a financial instrument associated with an amount of currency;
  pairing the private cryptographic key with a public cryptographic key;
  attaching the data storage medium to the at least one surface of the RAoM, wherein the RFID tag cannot be read until the metal can is opened;
  transferring the amount of currency to a destination represented by the public cryptographic key.

7. The method of claim 6, further comprising recording the transfer of the amount of currency to the destination represented by the public cryptographic key in a transaction record of a global ledger.

8. The method of claim 7, wherein the global ledger is a Bitcoin public ledger.

9. The method of claim 7, wherein the transaction record comprises the public key and information indicating the amount of currency that was transferred.

10. The method of claim 6, further comprising;
  receiving a message, the message comprising a merchant address, the public cryptographic key, and a digital signature, wherein the digital signature is based on the private cryptographic key; and
  in response to receiving the message, transferring the amount of currency from the destination represented by the public cryptographic key to the merchant address.

11. The method of claim 10, wherein the message further comprises information identifying a person.

12. The method of claim 10, wherein the digital signature is further based on a key from a recycling station.

13. The method of claim 6, wherein the public cryptographic key corresponds to an account number or address.

14. The method of claim 6, wherein the storing comprises storing the pointer to the private cryptographic key on the data storage medium, the method further comprising:
  receiving a message from an application, the message comprising the pointer.

15. The method of claim 14, further comprising:
  determining that a previous message comprising the pointer has not been received; and
  in response to the determining:
    transmitting the private cryptographic key to the application, and
    recording in a database a record comprising the pointer.

16. The method of claim 14, further comprising:
  determining that a previous message comprising the pointer has been received; and
  in response to the determining, transmitting an error message to the application.

17. A system for facilitating the recycling of a recyclable article of manufacture (RAoM), the system comprising:
  a RAoM comprising at least one surface, wherein the RAoM comprises a closed metal can, wherein the at least one surface is located inside of the metal can;
  a data storage medium attached to the at least one surface of the RAoM, wherein the data storage medium is a radio frequency identification (RFID) tag, wherein the RFID tag cannot be read until the metal can is opened, wherein the data storage medium stores a private cryptographic key or a pointer to the private cryptographic key, which is paired with a public cryptographic key, and wherein the private cryptographic key is a financial instrument associated with an amount of currency; and
  a computer server comprising a processor and a memory coupled to the processor, wherein the processor is configured to:
    transfer the amount of currency to a destination represented by the public cryptographic key.

* * * * *